(12) United States Patent
Liw et al.

(10) Patent No.: US 12,482,929 B2
(45) Date of Patent: Nov. 25, 2025

(54) SWITCHING DEVICE AS WELL AS SETUP

(71) Applicant: Rohde & Schwarz GmbH & Co. KG, Munich (DE)

(72) Inventors: Saxon Liw, Munich (DE); Terence Chin, Munich (DE); Dave Cheng, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 469 days.

(21) Appl. No.: 17/938,797

(22) Filed: Oct. 7, 2022

(65) Prior Publication Data
US 2024/0120647 A1    Apr. 11, 2024

(51) Int. Cl.
*H04B 1/44* (2006.01)
*H01Q 1/50* (2006.01)
*H04B 1/403* (2015.01)

(52) U.S. Cl.
CPC .............. *H01Q 1/50* (2013.01); *H04B 1/406* (2013.01)

(58) Field of Classification Search
CPC ........ H01Q 1/50; H04B 1/0053; H04B 1/006; H04B 1/06; H04B 1/16; H04B 1/1607; H04B 1/1615; H04B 1/44
See application file for complete search history.

(56) References Cited

U.S. PATENT DOCUMENTS

| | | | | |
|---|---|---|---|---|
| 4,803,447 A | * | 2/1989 | Schultz | H01Q 3/24 333/262 |
| 8,818,455 B2 | * | 8/2014 | Harrison | H04M 1/0274 343/702 |
| 8,897,407 B2 | * | 11/2014 | Badke | H04B 15/00 375/350 |
| 2003/0214443 A1 | * | 11/2003 | Bauregger | H01Q 21/28 343/700 MS |
| 2010/0202324 A1 | * | 8/2010 | Gorbachov | H04B 1/18 370/277 |
| 2019/0013570 A1 | * | 1/2019 | Caballero | H01Q 9/0421 |

FOREIGN PATENT DOCUMENTS

WO    2022132010 A1    6/2022

* cited by examiner

*Primary Examiner* — Tuan Pham
(74) *Attorney, Agent, or Firm* — Christensen O'Connor Johnson Kindness PLLC

(57) ABSTRACT

The present disclosure relates to a switching device including a switch as well as a first port, a second port and a third port. The switch has at least two different switching states. The first port is connected with the third port in a first switching state. The second port is connected with the third port in a second switching state. The switching device is capable of automatically setting the switching state of the switch in dependency of a direct current bias. Further, a setup is described.

19 Claims, 1 Drawing Sheet

SWITCHING DEVICE AS WELL AS SETUP

FIELD OF THE DISCLOSURE

The present disclosure generally relates to a switching device. Further, the present disclosure relates to a setup comprising a first antenna, a second antenna, a receiver and a switching circuit.

BACKGROUND

In the state of the art, antenna setups are known that comprise a receiver having at least one antenna port as well as at least one antenna that is connected with the receiver via the respective port. Typically, the receiver has more than one antenna port such that two or more antennas can be connected with the receiver. However, the number of antenna ports is limited such that the number of antennas is restricted which can be connected with the receiver.

To increase the number of antennas that can be connected with the receiver, so-called antenna switch boxes are known that are connected with one antenna port of the receiver, wherein the antenna switch boxes provide two or more connections for connecting different antennas. The antenna switch box typically comprises a radio frequency relay or an Ethernet interface via which the antenna switch box is controlled so as to provide an antenna line from the respective antenna selected to the antenna port of the receiver.

However, the antenna switch boxes require elaborate digital control or a separate input/output control such as open drain outputs, resulting high implementation efforts and high costs related thereto. In addition, the connection is not simple.

Additionally, a cable is required for forwarding the control signals to the antenna switch box, which has to be routed Typically, a system environment has only limited space for cables, thereby increasing the associated efforts again.

Accordingly, there is a need for a simple and cost-efficient solution to increase the number of antennas to be connected with the receiver.

SUMMARY OF THE DISCLOSURE

The present disclosure provides examples of a switching device. In an embodiment, the switching device comprises a switch as well as a first port, a second port and a third port. The switch has at least two different switching states. In a first switching state, the first port is connected with the third port, whereas the second port is connected with the third port in a second switching state. The switching device is capable of automatically setting the switching state of the switch in dependency of a direct current bias (DC bias).

Furthermore, the present disclosure provides examples of a setup. In an embodiment, the setup comprises a first antenna, a second antenna, a receiver and a switching circuit. The switching circuit comprises a switch as well as a first port, a second port and a third port. The first antenna is connected with the first port. The second antenna is connected with the second port. The receiver is connected with the third port. In a first switching state, the first port is connected with the third port, whereas the second port is connected with the third port in a second switching state. The switching circuit is capable of automatically setting the switching state of the switch based on a direct current bias.

The main idea is to use the direct current bias that may be issued by the receiver itself to which the switching device is connected anyway in order to control the switch. Therefore, it is not necessary to provide an additional cable for the control signals as it is done in the traditional solutions using antenna switch boxes. Furthermore, an additional cable routing for the control cable is not necessary. Hence, the space required for the control cable can be saved, thereby reducing the costs and the space required.

Further, no additional power source is required for controlling the switch, as the direct current bias provided can be used for setting the switch in the appropriate switching state. This further saves costs and also reduces the space required for the entire setup.

Since the switching device comprises three ports, the number of antennas to be connected with the receiver via the switching device can be increased. Therefore, the capabilities of the receiver are expanded with regard to the connection interfaces for antennas.

In some embodiments, the receiver may be generally configured to turn on and off the direct current bias, also called antenna bias, via a command, such as a software command. The respective direct current bias provided by the receiver may be used to set the switch of the switching device or the switching circuit appropriately, thereby ensuring that an antenna line is always provided, which may connect either the first port with the third port (first switching state) or the second port with the third port (second switching state).

An aspect of the disclosure provides that the switching state of the switch is, for example, solely set by the presence of the direct current bias. Thus, the presence of the direct current bias directly and automatically set the switching state of the switch appropriately. No manual input is necessary to adapt the setting of the switching device/switching circuit.

Another aspect of the disclosure provides that the first switching state is, for example, set in case a direct current bias is activated. In other words, the first port is connected with the third port in case that the direct current bias is present, e.g., provided at the third port. In this case, the antenna line is established between the first port and the third port, wherein the first antenna connected with the first port is biased by the direct current bias provided at the third port, namely from the receiver.

A further aspect of the disclosure provides, for example, that the second switching state is set in case the direct current bias is deactivated. Accordingly, the switching state may be set in case that the direct current bias is deactivated, namely not present at the third port. Thus, the second port is connected with the third port, thereby establishing the antenna line between these ports.

Generally, the antenna line may be toggled in case the direct current bias is present or not. In other words, the antenna line may be established either with the first antenna, namely the first port, or the second antenna, namely the second port. In case a previously present direct current bias is deactivated, e.g., not present anymore, the switch is switched to its other switching position. In case a direct current bias is suddenly present, e.g., activated, the switch is switched to its other switching position.

In some embodiments, the first switching state of the switch is associated with a first switching position of the switch. Further, the second switching state of the switch is associated with a second switching position of the switch.

As already discussed above, the direct current bias may be forwarded via a line connected with the third port. The line may correspond to the line portion established between the third port and the switch. However, the direct current bias is only forwarded to the first port since the presence of the direct current bias causes the first switching state of the switch, in which the antenna line is established between the first port and the third port. In other words, the antenna line forwarding the direct current bias is always established between the first port and the third port.

In some embodiments, the antenna line established between the second port and the third port will never forward the direct current bias, as the presence of the direct current bias causes the switch to connect the third port to the first port.

In the first switching state of the switch, the switching device may be capable of forwarding the direct current bias from the third port to the first port. Therefore, the first antenna connected with the first port is biased appropriately. Hence, an active antenna may be connected with the first port, which needs to be biased by the receiver.

In some embodiments, the switching device may comprise a single pole, double throw (SPDT) switching circuit. Hence, two different ports, namely the first port and the second port, may be connected with the third port. In other words, the third port is always connected with one of the first port and the second port, which depends on the switching state of the switch, for example the presence of the direct current bias that causes the switching state of the switch.

Further, the third port may be connected to an internal control line that is connected to the switch. The control line includes two chokes. The internal control line processes the direct current bias if available such that the switching state of the switch is adapted if necessary. In other words, the first switching state, namely the first switching position of the switch, is obtained due to the direct current bias processed by the control line, e.g., at least one of the chokes.

The first port, the second port and the third port may be radio frequency ports. The switch may be a radio frequency switch. Therefore, the switching device/circuit is generally enabled to process radio frequency signals appropriately. The radio frequency signals may be received by the first antenna and/or the second antenna, wherein the radio frequency signal may be is converted to an electric signal by the respective antenna, which may be forwarded to the receiver for further processing.

The switching device may comprise an enclosure that encompasses the switch. The first port, the second port and the third port may be located at an outer shell of the enclosure. Hence, the switching device may correspond to a box that may be located anywhere between the antenna(s) and the receiver.

For instance, the enclosure is an IP65 enclosure or an IP67 enclosure. Therefore, the respective switching device can be used in outdoor applications, wherein the inner circuitry is protected from environmental conditions.

An aspect of the disclosure provides that the receiver, for example, provides the direct current bias. The respective direct current bias may be turned on and off via software commands processed by the receiver.

The switching circuit may be integrated in an expansion box that extends the capability of the receiver, as a single antenna port of the receiver is connected via the expansion box to the first antenna and the second antenna. Therefore, the number of antennas to be connected with the receiver can be increased accordingly due to the expansion box that is connected between the receiver and the antennas.

For instance, the first antenna and the second antenna both are passive antennas. Hence, it is not necessary that any of the antennas receives a direct current bias from the receiver, which may be turned off via software command. To use the first antenna being a passive antenna, an additional direct current block may be used on the path with the direct current bias if the first antenna is not natively high impedance at direct current.

Another aspect of the disclosure provides that the first antenna is an active antenna and the second antenna is a passive antenna. The active antenna is biased by the direct current bias of the receiver that is forwarded from the receiver via the switching device/circuit towards the first port to which the first antenna is connected.

Hence, the switching circuit may be a single pole, double throw (SPDT) switching circuit, e.g., a SPDT radio frequency (RF) switching circuit.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
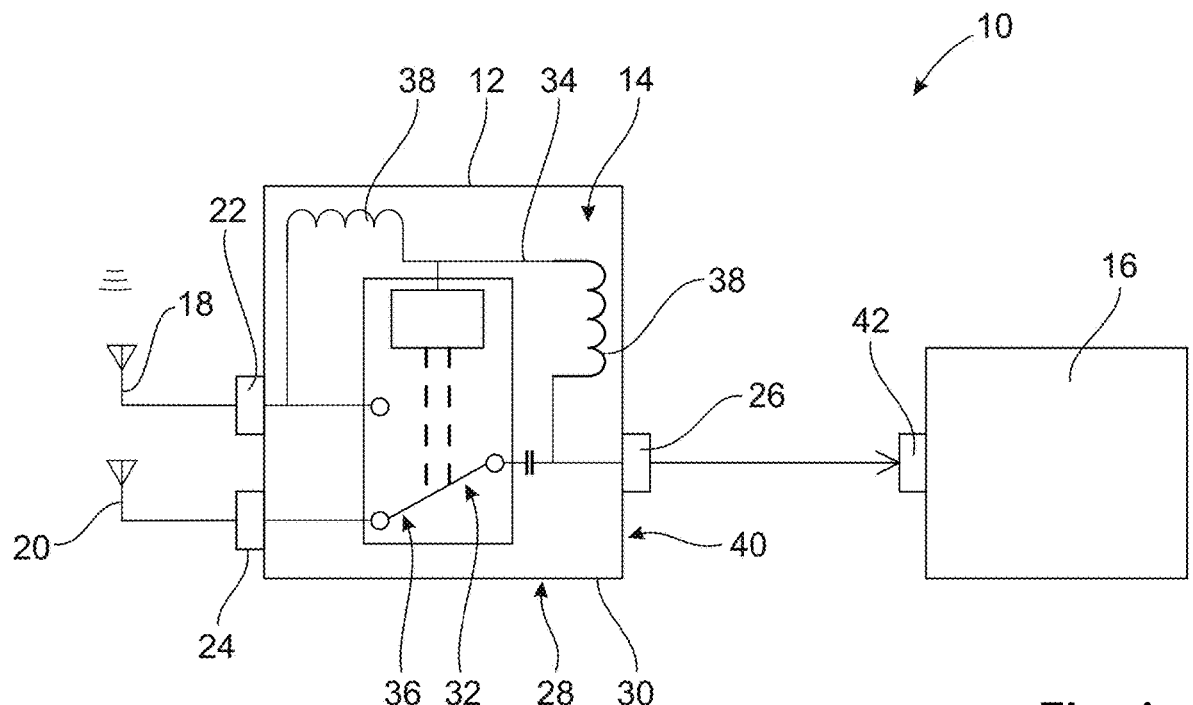
FIG. 1 schematically shows an overview of a setup according to an embodiment of the present disclosure, which comprises an example of a switching device according to the present disclosure in a first state.
Figure 2:
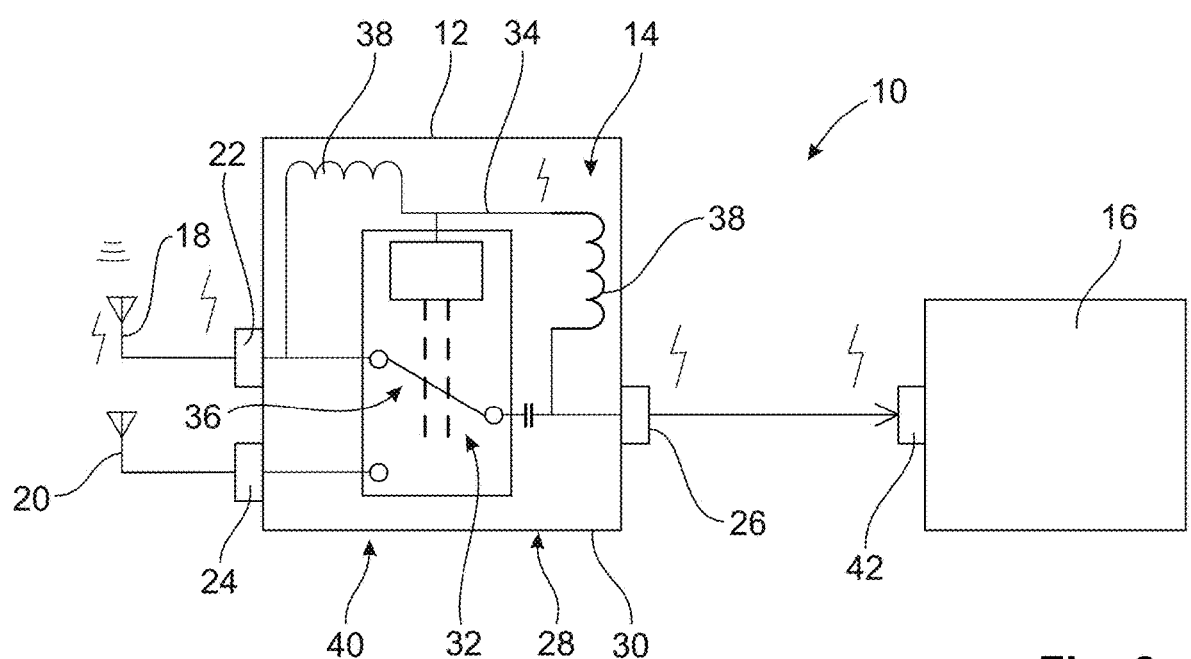
FIG. 2 shows the setup of FIG. 1 in a second state.

In FIGS. 1 and 2, a setup 10 is shown in different states, which is generally used for receiving radio frequency signals from an environment. In the embodiment shown, the setup 10 comprises a switching device 12 interconnected between a receiver 16 and first and second antennas 18, 20. The switching device 12 includes a switching circuit 14.

The switching device 12 further includes a first port 22, a second port 24, and a third port 26. Each of the ports 22, 24, 26 is located on an outer shell 28 of an enclosure 30 of the switching device 12. The switching device 12 includes an internal switch 32 that is connected with the first port 22, the second port 24 and the third port 26. The switching device 12 is connected with the receiver 16 via the third port, the first antenna 18 is connected with the first port 22, and the second antenna 20 is connected with the second port 24.

Generally, the switching circuit 14, e.g., the switch 32, has two different switching states or switching positions. In some embodiments, the switching circuit 14 corresponds to a single pole, double throw (SPDT) switching circuit, as the third port 26 is connected either to the first port 22 or the second port 24 via the switch 32, as will be described later in more detail.

Generally, the switching device 12 or the switching circuit 14 is capable of automatically setting the switching state or the switching position of the switch 32 in dependency of a direct current bias which is provided by the receiver 16 at the third port 26. This state is shown in FIG. 2, wherein the flashes shall indicate the presence of the direct current bias which may be set via a software command at the receiver 16.

The switching circuit 14 comprises an internal control line 34 that is connected with the switch 32 such that the internal control line 34 is used to control the switch 32, namely its state or position. In addition, the internal control line 34 is connected with the third port 26 such that any direct current bias provided by the receiver 16 at the third port 26 is forwarded to the internal control line 34. The internal control line 34 processes the direct current bias so as to control the switch 32 automatically, namely in dependency of the presence of the direct current bias.

In case the direct current bias is activated or present, a first switching state is automatically set in which the first port 22 is connected with the third port 26, thereby establishing an antenna line 36 via which the first antenna 18 is connected to the receiver 16. This state is shown in FIG. 2.

In case the direct current bias is deactivated or not present, a second switching state is automatically set, which means that the second port 24 is connected with the third port 26, thereby establishing the antenna line 36 via which the second antenna 20 is connected to the receiver 16. This state is shown in FIG. 1.

Accordingly, the internal control line 34 processes any signal present at the third port 26, e.g., a signal issued by the receiver 16, in order to control the switch 32 automatically, thereby setting the switch 32 appropriately.

Hence, no manual input is necessary, as the switching operation is issued by the direct current bias that is provided by the receiver 16. In some embodiments, the switching state of the switch 32 is solely set by the presence of the direct current bias which is sensed by the internal control line 34.

For sensing/controlling purposes, the internal control line 34 comprises, for example, two chokes 38 that are interconnected between the third port 26 and the first port 22.

Generally, the enclosure 30 may relate to an IP65 enclosure or an IP67 enclosure such that the entire switching device 12 or the switching circuit 14 can be used in an outdoor application.

In some embodiments, the switching circuit 14, for example the switching device 12 itself, may be integrated in an expansion box 40 that extends the capability of the receiver 16, as a single antenna port 42 of the receiver 16 is connected via the expansion box 40 to two different antennas, namely the first antenna 18 and the second antenna 20.

As already mentioned above, the setup 10 and, thus, the switching device 12 or the switching circuit 14 is used for receiving radio frequency signals from the environment. Hence, the first port 22, the second port 24 and the third port 26 are radio frequency ports. Further, the switch 32 is a radio frequency switch. Hence, it is ensured that radio frequency signals can be processed appropriately.

The first antenna 18 and the second antenna 20 may both correspond to passive antennas. However, the first antenna 18 may also correspond to an active antenna that requires the direct current bias from the receiver 16. Accordingly, the first switching state is set automatically in case the direct current bias is present, which ensures that the first antenna 18 is connected to the receiver 16 so as to receive the direct current bias from the receiver 16. The direct current bias is forwarded to the first antenna 18 via the antenna line 36, namely the switching device 12 or the switching circuit 14.

Hence, the capability of the receiver 16 can be extended in a cost-efficient and simple manner, which requires less components, e.g., less cables, thereby reducing the overall costs associated with the setup 10.

Certain embodiments disclosed herein utilize circuitry (e.g., one or more circuits) in order to implement protocols, methodologies or technologies disclosed herein, operably couple two or more components, generate information, process information, analyze information, generate signals, encode/decode signals, convert signals, transmit and/or receive signals, control other devices, etc. Circuitry of any type can be used.

In an embodiment, circuitry includes, among other things, one or more computing devices such as a processor (e.g., a microprocessor), a central processing unit (CPU), a digital signal processor (DSP), an application-specific integrated circuit (ASIC), a field programmable gate array (FPGA), a system on a chip (SoC), or the like, or any combinations thereof. Alternatively, circuitry may include, for example, discrete digital or analog circuit elements or electronics, or combinations thereof capable of implementing the respective functionality described herein.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A and B" is equivalent to "A and/or B" or vice versa, namely "A" alone, "B" alone or "A and B.". Similarly, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The invention claimed is:

1. A switching device, comprising:
 a switch having at least two different switching states;
 a first port, a second port and a third port,
 wherein the first port is connected with the third port in a first switching state, wherein the second port is connected with the third port in a second switching state,
 wherein the switching device is capable of automatically setting the switching state of the switch in dependency of a direct current bias,
 wherein the first switching state is set in case that the direct current bias is present at the third port,
 wherein the second switching state is set in case the direct current bias is not present at the third port, and
 wherein the switching device comprises an internal control line that is connected with the switch and the third port such that the internal control line processes the direct current bias in order to control the switching state of the switch.

2. The switching device according to claim 1, wherein the switching state of the switch is solely set by the presence of the direct current bias.

3. The switching device according to claim 1, wherein the first switching state is set in case the direct current bias is activated.

4. The switching device according to claim 1, wherein the second switching state is set in case the direct current bias is deactivated.

5. The switching device according to claim 1, wherein the direct current bias is forwarded via a line connected with the third port.

6. The switching device according to claim 1, wherein the switching device, in the first switching state of the switch, is capable of forwarding the direct current bias from the third port to the first port.

7. The switching device according to claim 1, wherein the switching device comprises a single pole, double throw switching circuit.

8. The switching device according to claim 1, wherein the third port is connected to an internal control line that is connected to the switch, and wherein the internal control line includes two chokes.

9. The switching device according to claim 1, wherein the first port, the second port and the third port are radio frequency ports, and wherein the switch is a radio frequency switch.

10. The switching device according to claim 1, further comprising an enclosure that encompasses the switch, and wherein the first port, the second port and the third port are located at an outer shell of the enclosure.

11. The switching device according to claim 10, wherein the enclosure is an IP 65 enclosure or an IP 67 enclosure.

12. A setup, comprising:
a first antenna;
a second antenna;
a receiver; and
a switching circuit comprising a switch, a first port, a second port and a third port,
wherein the first antenna is connected with the first port, the second antenna is connected with the second port, and the receiver is connected with the third port,
wherein the first port is connected with the third port in a first switching state that is set when the direct current bias is provided by the receiver, wherein the second port is connected with the third port in a second switching state that is set when the direct current bias is not provided by the receiver, and wherein the switching circuit is capable of automatically setting the switching state of the switch based on a direct current bias that sets the switching device such that an antenna line is always provided, wherein the antenna line connects either the first antenna with the third port in the first switching state or the second antenna with the third port in the second switching state.

13. The setup according to claim 12, wherein the receiver provides the direct current bias.

14. The setup according to claim 12, wherein the direct current bias is forwarded via a line connected with the third port.

15. The setup according to claim 12, wherein the switching circuit is capable of forwarding the direct current bias to the first antenna via the first port in the first switching state of the switch.

16. The setup according to claim 12, wherein the switching circuit is integrated in an expansion box that extends the capability of the receiver, as a single antenna port of the receiver is connected via the expansion box to the first antenna and the second antenna.

17. The setup according to claim 12, wherein the first antenna and the second antenna both are passive antennas.

18. The setup according to claim 12, wherein the first antenna is an active antenna and the second antenna is a passive antenna.

19. The setup according to claim 12, wherein the switching circuit is a single pole, double throw switching circuit.

* * * * *